No. 716,710. Patented Dec. 23, 1902.
P. HOFMAN.
APPARATUS FOR MEASURING DISTANCES.
(Application filed Mar. 21, 1902.)
(No Model.) 3 Sheets—Sheet 1.

Witnesses.
Robert Everett,

Inventor.
Peter Hofman.
By James L. Norris.
Atty.

No. 716,710. Patented Dec. 23, 1902.
P. HOFMAN.
APPARATUS FOR MEASURING DISTANCES.
(Application filed Mar. 21, 1902.)
(No Model.) 3 Sheets—Sheet 2.

Witnesses. Inventor,
Peter Hofman.
By
Atty.

No. 716,710. Patented Dec. 23, 1902.
P. HOFMAN.
APPARATUS FOR MEASURING DISTANCES.
(Application filed Mar. 21, 1902.)

(No Model.) 3 Sheets—Sheet 3.

Witnesses.

Inventor
Peter Hofman
By James L. Norris
Atty.

THE NORRIS PETERS CO., PHOTO-LITHO., WASHINGTON, D. C.

UNITED STATES PATENT OFFICE.

PETER HOFMAN, OF LOS ANGELES, CALIFORNIA.

APPARATUS FOR MEASURING DISTANCES.

SPECIFICATION forming part of Letters Patent No. 716,710, dated December 23, 1902.

Application filed March 21, 1902. Serial No. 99,283. (No model.)

*To all whom it may concern:*

Be it known that I, PETER HOFMAN, a citizen of the United States, residing at Los Angeles, in the county of Los Angeles and State of California, have invented new and useful Improvements in Apparatus for Measuring Distances, of which the following is a specification.

My invention relates to systems and apparatus for measuring distances, the object of the same being to provide novel means for measuring the distance of an object on the surface of the earth from a given point, novel means for measuring the distance from the center of the earth of an object removed from the earth, and novel means for measuring the diameter of an object distant from the earth.

The aim of the invention is to secure greater accuracy in the measurements above named than it has been able to secure before.

Other objects and advantages of the invention will hereinafter appear, and the novel features thereof will be set forth in the claims.

Figure 1:
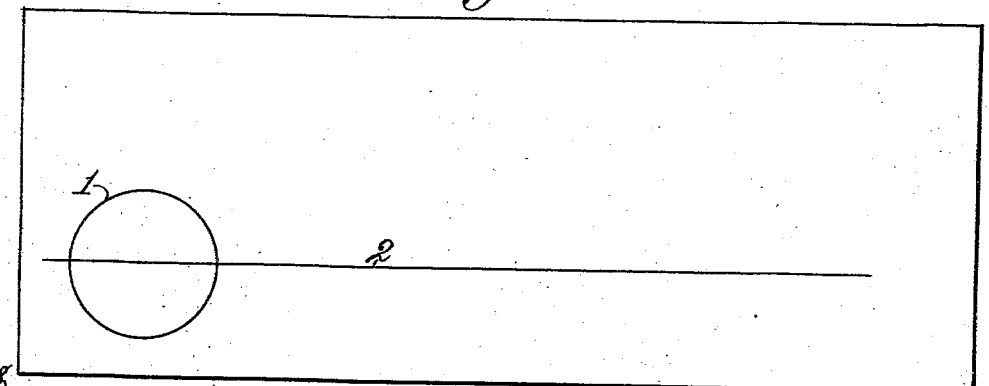
Figure 2:
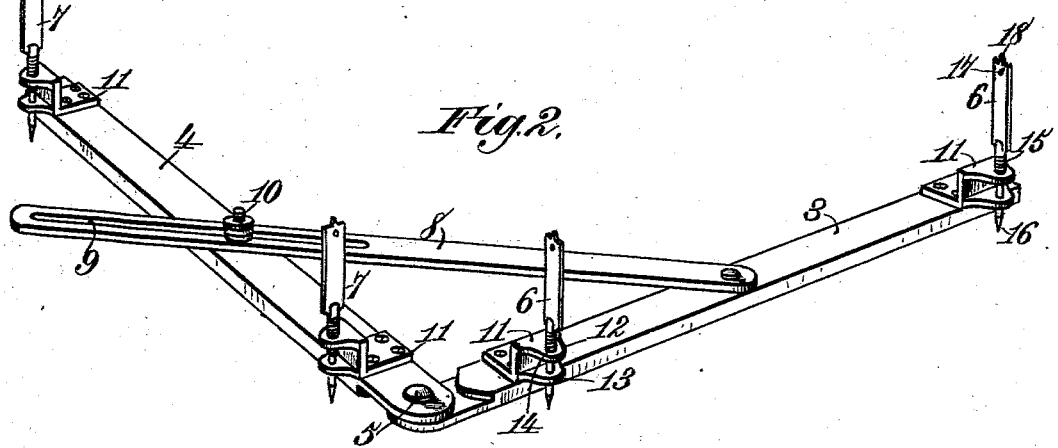
Figure 3:
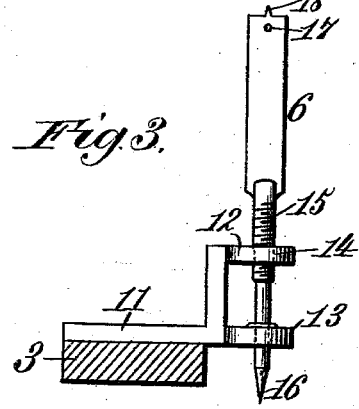
Figure 4:
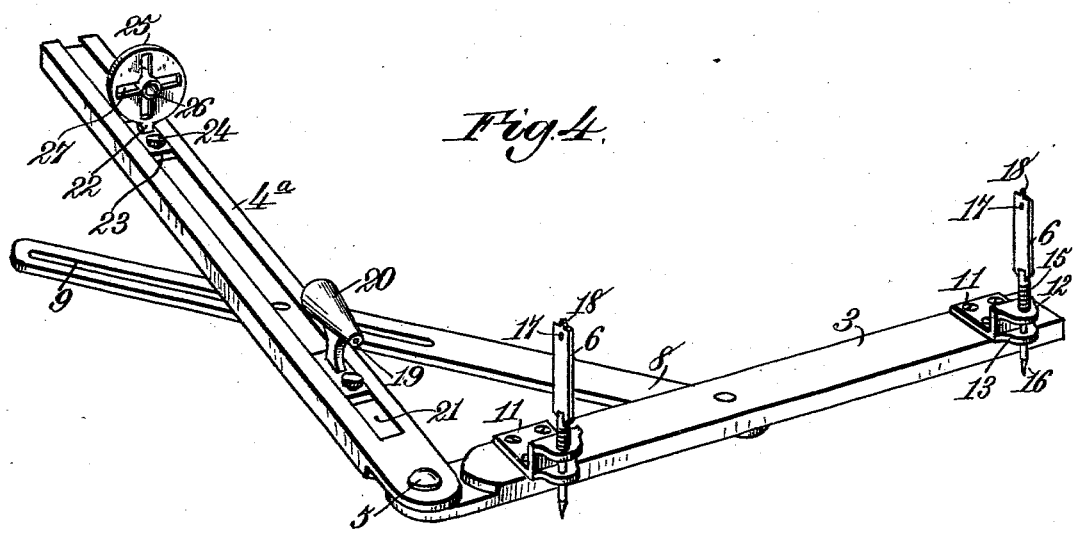
Figure 5:
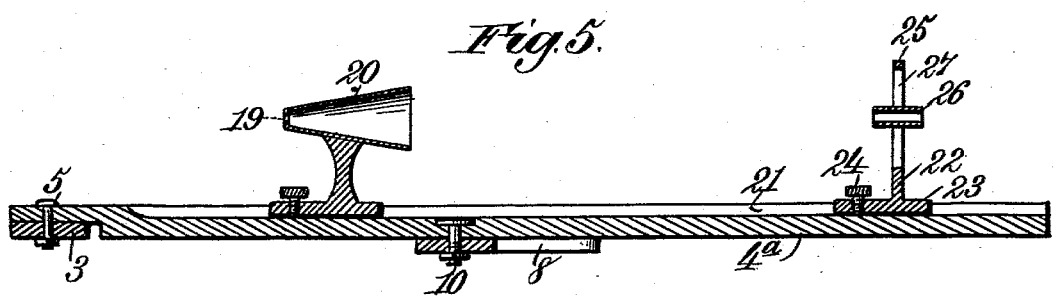
Figure 6:
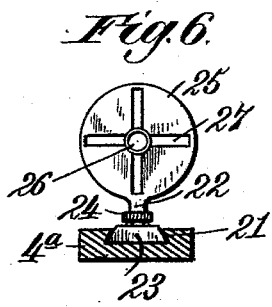
Figure 7:
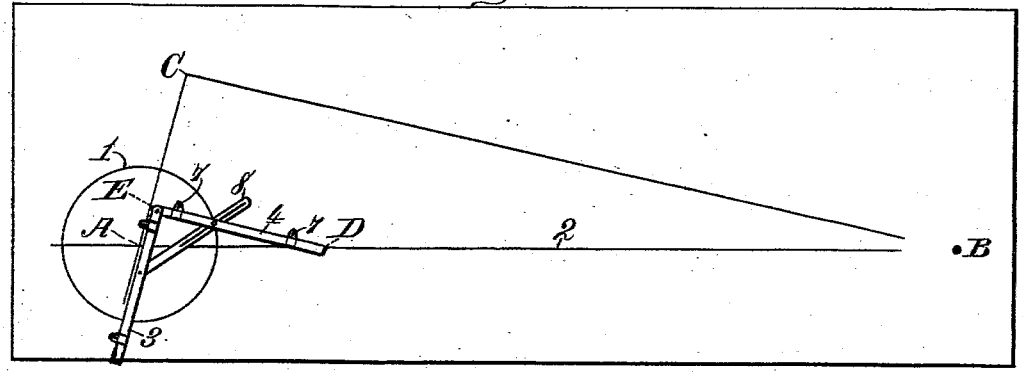
Figure 8:
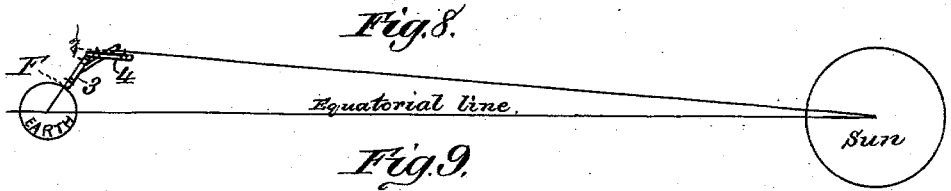
Figure 9:
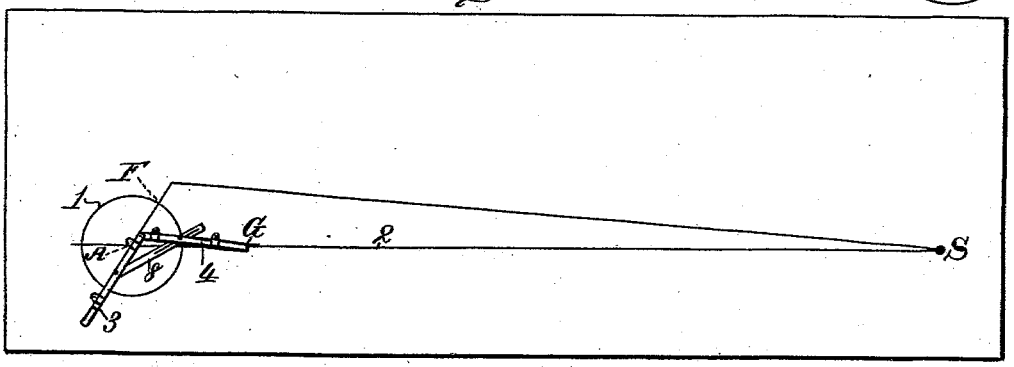
Figure 10:
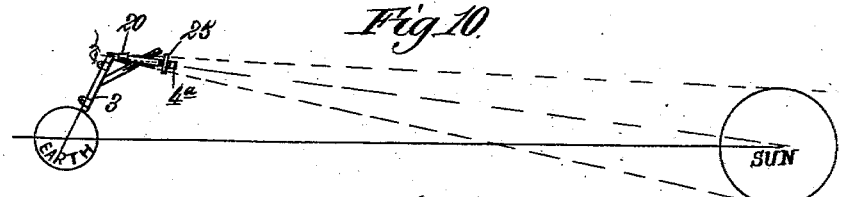
Figure 11:
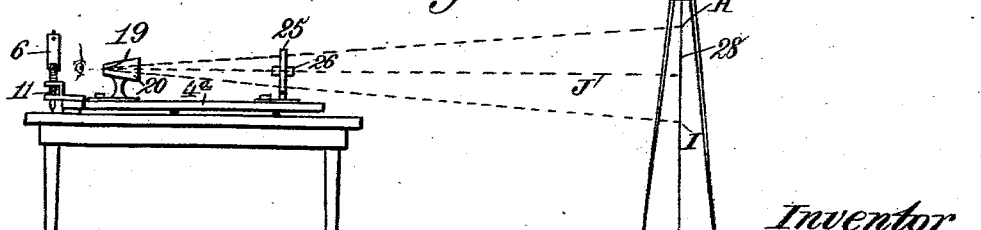

In the drawings forming part of this specification, Figure 1 is a face view of the plat employed. Fig. 2 is a perspective view of the sighting instrument. Fig. 3 is a detail cross-sectional view through one of the sight-carrying brackets. Fig. 4 is a perspective view of a modified form of sighting instrument. Fig. 5 is a longitudinal section through one of the arms thereof. Fig. 6 is a cross-sectional view through one of the arms thereof, and Figs. 7, 8, 9, 10, and 11 are diagrammatic views showing the method of use of the instrument.

Like characters refer to like parts in all the figures of the drawings.

In carrying out my system I employ a plat having printed or otherwise impressed thereon a circle 1 of suitable diameter and also having printed or otherwise impressed thereon a line 2, extending through the center of the circle and representing what I term the "base-line." Of course instead of having the circle 1 and line 2 originally printed upon the plat they may be drawn thereon when it is desired to bring the plat into use. In connection with this plat I employ what I term a "sighting" instrument, the same comprising the arms 3 4, pivoted to each other at 5, provided with means whereby they may be locked to each other against pivotal movement and having sights 6 6 and 7 7 thereon. The locking means for the arms 3 and 4 consists of a link 8, pivoted to the arm 3, overlapping the arm 4 and having an elongated slot 9 therein. Extending through the slot 9 and into the arm 4 is a set-screw or locking-screw 10, by means of which the link 8 may be locked to said arm 4. The sights 6 6 on the arm 3 are preferably located at opposite ends thereof, the same being mounted in brackets 11, screwed or otherwise permanently secured to said arm. Each of the brackets 11 is provided with outwardly-extending preferably parallel lugs or flanges 12 13, having screw-threaded openings 14 therein, which openings lie in line with each other and are adapted to receive the screw-threaded stems 15 of the sights 6. Each of said stems has the end thereof opposite the sight 6 made in the form of a pointed projection 16, for a purpose which will presently appear. The sights 6 may be of any suitable form and construction;
but I prefer to make each of them in the form of a flat strip or plate of metal having a peep-opening 17 near its upper end and a pointed tooth or projection 18 on its upper edge directly above the opening 17. By reason of the fact that the stems 15 of the sights 6 fit within the screw-threaded openings 14 in the lugs or flanges 12 and 13 it will be obvious that by turning the sights 6 in one direction or the other they may be raised or lowered. The object of the raising and lowering of these sights is to enable an object to be viewed which lies at an angle to the plane of the arms 3 and 4. The sights 7 on the arm 4 are similar in all respects, both as to construction and means of mounting the same, to the sights 6. The pointed projections 16 at the inner ends of the stems 15 of the sights 6 are to enable the arm 3 or 4 to be adjusted in a truly vertical position by means of a plumb-line arranged in close relation thereto.

For determining the diameter of a distant object I employ a slightly-modified form of sighting instrument, the same differing from the instrument just described in that the arm 4ª, which is pivoted to the arm 3 and adapted to be locked thereto in the manner just described, has the sight 19 at the inner end thereof provided with a funnel 20, extending in the direction of the outer end of the arm 4ª and designed for the purpose of excluding light from the sight 19 to such an extent as to render the vision through said sight more perfect. The said arm is also provided on the same side as that on which the sight 19 is located with a dovetailed groove 21, the said groove extending longitudinally of said arm and having adjustably mounted therein a bracket 22, the base 23 of said bracket being dovetailed to correspond with the groove 21, in which it fits. A set-screw 24 extends through the base 23 and acts upon the bottom wall of the groove 21 to lock said bracket in any position to which it may be moved along said groove. The bracket 22 has secured to it and movable therewith a sighting-disk 25, the said disk being provided with a ring or tube 26 at its center, by means of which the center of the object to be measured may be sighted from the sight 19 and having radially-disposed slots 27 around said tube or ring 26, by means of which the lines of vision extending to the outside of the object being viewed may be determined. As the disk 25 is secured to the bracket 22 the same is longitudinally movable along the arm 4ª, for a purpose which will hereinafter appear. As will be noted from the drawings, some of the slots 27 lie at right angles to the others.

In carrying out my system by means of the apparatus above described I proceed as follows: Say, for example, it is desired to measure the distance between two distant points on the earth's surface, and it may be here remarked that the distance between any two points which can be seen one from the other may be measured accurately by means of my invention. We will assume, for purposes of illustration, that we want to measure the distance between the points A and B, A being the point where the operator is located. The center of the circle 1 on the plat heretofore referred to will represent the point A, and the plat is so disposed that the line 2 or the base-line thereon will coincide with the line of vision between the points A and B in the field. At any suitable point C, removed from the point A at any suitable angle, a sight is taken along the arm 4 of the instrument above described to the point B and along the arm 3 of said instrument to the point A, the sights 7 7 and 6 6 being brought into play for this purpose. The arms 3 and 4 of the instrument must be set in a truly horizontal position, and if any elevation or depression be desired the same may be obtained by raising or lowering the sights 7 and 6. When the arm 4 has been moved with respect to the arm 3 so that the sights 7 7 are on the point B and the sights 6 6 are on the point A, the locking-screw 10 is turned so as to lock the link 8 to the arm 4, and thereby lock both the arms 3 and 4 to each other. To determine the line A C on the plat, the said plat is placed with the base-line 2 coincident with the line A B in the field, and the instrument is placed upon the plat with the arm 3 intersecting the point A and the sights 6 6 directed toward the point C in the field. The instrument, with the two arms locked together, is moved upon the plat with the edge of the arm 3 lying coincident with the line extending between the points A and C until such a position is reached that the arm 4 of the instrument will intersect the base-line 2 at a certain point—say at the point D. At such time the forward end of the arm 3 will mark off the point E on the plat along the line A C. The actual distance between the points A and C may of course be determined by measurement, and the distances A E and A D may be readily measured by the plat.

Assume the distance A C to be two hundred feet, the distance A E three inches, and the distance A D three feet. Then we have the proportion: As three inches are to three feet so are two hundred feet to A B, the distance A B being thus determined as two thousand four hundred feet.

To measure the distance to the sun, a planet, or a star, I proceed somewhat differently, although the principle of operation is identical with that above described. Say, for example, I desire to measure the distance of the sun from the earth at noon on the 21st of March or September. As is well known, the sun at such time is in a direct line with the equator. If the operator be located at the point F, forty degrees north of the equator, his observation is taken at noon and he proceeds as follows: The instrument first above described is placed with the arm 3 thereof in a perfectly upright position—that is, so that it extends along a line running to the center of the earth. This position of the arm 3 may be determined by means of a plumb-line, opposite which the pointed projections 16 on the shanks 15 of the sights 6 are accurately adjusted. Through the sights 7 on the arm 4 a view is taken to the center of the sun, and the two arms 3 and 4 are locked to each other by means of the set-screw 10, which coöperates with the link 8 and the arm 4. On the plat the circle 1 may be considered as representing the earth, and the base-line 2, which extends through the center A of said circle to the point S, representing the sun, may be considered as the line of vision between the equator and the sun. As the point F is forty degrees north of the equator, the line A F will extend at an angle of forty degrees to the base-line 2 or A S. The instrument through which the sun was sighted at the point F is now placed upon the plat with the arm 3 lying coincident with the line A F and the arm 4 intersecting a point—say the point G—on the base-line 2. The distance A G may be accurately measured on the plat, as well as the distance A F on the plat, and assuming that the distance A F on the plat is four inches and the distance A F to the center of the earth is four thousand miles, the distance A S, or the distance from the earth to the sun, may be determined by multiplying four thousand by the quotient obtained by dividing the number of inches from A to G on the plat by the number of inches from A to F on the plat.

If the measurements above described be taken at any other time than at noon on the 21st of March or the 21st of September, it is of course necessary to know the position of the sun with respect to the earth. This may be readily determined by published tables. Say, for example, however, that the measurement is taken on January 1. The sun will then be located south of the equator a certain number of degrees. Assume that it is fifteen degrees south of the equator. It will then lie at an angle of fifty-five degrees from the point F. When the sighting instrument, therefore, is placed upon the plat, the arm 3 thereof must be placed along the line A F, which is drawn on the plat from the central point A of the circle to the circumference thereof at an angle of fifty-five degrees to the base-line 2. A similar procedure will be followed when measuring the distance of an unknown star—that is to say, the measurement will be made at a point located a certain known number of degrees north or south of a given point on the same meridian of longitude as said given point and at a time when the said star is located in said meridian. The method of procedure will then be identical with that above described.

To measure the diameter of a distant body—say, for example, the sun—I first measure the distance of the sun from the earth by the means just described, which distance then becomes a known one. Preferably at the same time I bring into use the modified form of instrument which carries the sight 19 and the disk 25 on the arm 4ª thereof. The arm 3 of said modified instrument is adjusted by the means above described so that it lies in a truly vertical position. The arm 4ª is then moved so that the line of vision between the sights 19 and the ring or tube 26 at the center of the disk 25 extends through the center of the sun or other object being viewed. The arm 4ª is then locked in this position to the arm 3 by means of the locking-screw 10, and the set-screw 24, which locks the bracket 22 to the arm 4ª, is loosened. The said bracket and the disk 25, carried thereby, are then moved forwardly or backwardly until the lines of vision from the outer edges of the sun or other object to the sight 19 intersect the slots 27 at their extreme outer edges. When the proper position of the disk 25 has been thus obtained, the set-screw 24 is moved inwardly, so as to lock the bracket 22 and said disk from displacement on the arm 4ª. The instrument is now displaced from its upright position and, with the disk 25 locked to the arm 4ª, is placed in horizontal position on a table or other support, with the ring or tube 26 on the disk 25 in the same horizontal plane with the sight-opening 19. A plumb-line 28 is now brought into play, the same being located in line with the sight 19 and disk 25 on the side of said disk opposite said sight. A view is then taken through the sight 19 along the outer edges of the two vertical slots 27 in the disk 25, and the points H and I where the lines of sight intersect the plumb-line 28 are marked off. The distance of the line 28 from the sight 19, which may be represented by the line J, is then measured, and the distance between the points H and I on the plumb-line 28 is then measured off. We now have the proportion: As the length of the line J is to the length of the line H I so is the distance from the earth to the sun to the diameter of the sun. As the line J, the line H I, and the distance from the earth to the sun are all known distances, the unknown distance or the diameter of the sun may be readily determined.

Having now described my invention, what I claim as new, and desire to secure by Letters Patent, is—

1. An instrument for use in distance measurements, consisting of two arms pivoted to each other, means for locking said arms against pivotal movement, one on the other, and sighting devices having screw-threaded connections with said arms whereby they may be adjusted.

2. An instrument for use in distance measurements, consisting of two arms pivoted to each other, a link pivoted to one of said arms and adjustably connected with the other for locking said arms against pivotal movement one on the other, and sights having screw-threaded shanks thereon fitting within corresponding screw-threaded openings in said arms.

3. An instrument for use in distance measurements, consisting of two arms pivoted to each other, means for locking said arms against pivotal movement with respect to each other, sights carried by both of said arms, brackets in which the sights on one of said arms are mounted, having screw-threaded openings therein, and screw-threaded shanks on said sights adapted to fit within said openings.

4. An instrument for use in distance measurements, consisting of two arms pivoted to each other, means for locking said arms against pivotal movement with respect to each other, sights carried by both of said arms, brackets in which the sights on one of said arms are mounted, said brackets having outwardly-extending parallel lugs or flanges thereon, and said lugs having alined screw-threaded openings therein, and screw-threaded shanks on said sights adapted to fit and be adjustable in said openings.

5. An instrument for use in distance measurements, consisting of two arms pivoted to each other, means for locking said arms against pivotal movement with respect to each other, sights carried by both of said arms, the sights on one of said arms having screw-threaded shanks provided with pointed projections at their ends, and brackets having screw-threaded openings therein in which said shanks are adapted to fit, the pointed projections on said shanks serving as a means for adjusting the position of said instrument.

6. An instrument for use in distance measurements, consisting of two arms pivoted to each other, means for locking said arms against pivotal movement with respect to each other, a sight at the inner end of one of said arms and a longitudinally-movable disk on the same arm, said disk having a central opening therethrough, and elongated slots radiating from said opening.

7. An instrument for use in distance measurements, consisting of two arms pivoted to each other, means for locking said arms against pivotal movement with respect to each other, a sight at the inner end of one of said arms, a longitudinally-movable disk on the same arm, said disk having a central opening therethrough and elongated slots radiating from said opening, and means for locking said disk in adjusted position on said arm.

8. An instrument for use in distance measurements, consisting of two pivoted arms, one of which is provided with a longitudinally-extending guideway, means for locking said arms against pivotal movement with respect to each other, a sight on the arm provided with said guideway, a bracket movable in said guideway, and a disk secured to said bracket, the said disk having a central opening therein, and radiating slots leading outwardly from said opening.

9. An instrument for use in distance measurements, consisting of two pivoted arms, one of which is provided with a longitudinally-extending guideway, means for locking said arms against pivotal movement with respect to each other, a sight on the arm provided with said guideway, a bracket movable in said guideway, a disk secured to said bracket, the said disk having a central opening therein and radiating slots leading outwardly from said opening, and means for locking said bracket in adjusted position in the said guideway.

10. An instrument for use in distance measurements, consisting of two pivoted arms, one of which is provided with a longitudinally-extending dovetailed groove, means for locking said arms against pivotal movement with respect to each other, a sight carried by the arm in which said groove is formed, a bracket having a dovetailed base fitting and movable in said groove, a set-screw extending through said base for locking said bracket in adjusted position, and a disk carried by said bracket having a central tube or ring therein, and elongated slots radiating from said ring.

In testimony whereof I have hereunto set my hand in presence of two subscribing witnesses.

PETER HOFMAN.

Witnesses:
GOMER JONES,
WM. M. STOCKBRIDGE.